US009929955B2

(12) United States Patent
Longobardi et al.

(10) Patent No.: US 9,929,955 B2
(45) Date of Patent: Mar. 27, 2018

(54) LOCAL SESSION LOOPBACK PROTOCOL

(71) Applicant: International Business Machines Corporation, Armonk, NY (US)

(72) Inventors: Giuseppe Longobardi, Naples (IT); Scot MacLellan, Rome (IT)

(73) Assignee: International Business Machines Corporation, Armonk, NY (US)

(*) Notice: Subject to any disclaimer, the term of this patent is extended or adjusted under 35 U.S.C. 154(b) by 390 days.

(21) Appl. No.: 14/573,393

(22) Filed: Dec. 17, 2014

(65) Prior Publication Data

US 2016/0182573 A1    Jun. 23, 2016

(51) Int. Cl.
*G06F 15/16* (2006.01)
*H04L 12/801* (2013.01)
*H04L 29/06* (2006.01)
*H04L 12/861* (2013.01)
*H04L 12/911* (2013.01)

(52) U.S. Cl.
CPC .......... *H04L 47/12* (2013.01); *H04L 65/1069* (2013.01); *H04L 67/42* (2013.01); *H04L 47/70* (2013.01); *H04L 49/90* (2013.01)

(58) Field of Classification Search
CPC . H04L 67/2842; H04L 47/12; H04L 67/2833; H04L 67/289; H04L 61/6009
See application file for complete search history.

(56) References Cited

U.S. PATENT DOCUMENTS 6,826,626 B1 * 11/2004 McManus ......... G06F 17/30902
707/999.101
8,539,036 B2   9/2013 Kohli et al.

2008/0080398 A1 * 4/2008 Yasuie ............... H04L 12/2697
370/254
2009/0024379 A1 * 1/2009 Takahashi .......... G06F 17/5022
703/16
2009/0129557 A1   5/2009 Carter et al.
(Continued)

FOREIGN PATENT DOCUMENTS

GB     2510493 A     8/2014
WO   2010138124 A1  12/2010

OTHER PUBLICATIONS

Cushing, Patrick et al.; Loopback Test Unit Benefits. 2016, 2016 IEEE Autotestcon, pp. 1-4.*

(Continued)

*Primary Examiner* — Shean Tokuta

(74) *Attorney, Agent, or Firm* — William H. Hartwell; John W. Hayes

(57) ABSTRACT

A method for efficient utilization of available bandwidth over a data connection between a client computer and a server computer. An echo component on both the sending and receiving side of the connection registers a set of connection parameters, and stores a copy of the last transmitted request or response of the client and server computer systems. Once an echo component detects a duplicate data request or response, it simulates and transmits the last stored response back to the client or server computer system and notifies the remote side echo component to send data when it is ready. When non-duplicate data is ready to be transmitted, the local side echo component disables the loopback protocol then notifies the remote side to do the same and the data is transmitted.

10 Claims, 6 Drawing Sheets

(56) References Cited

U.S. PATENT DOCUMENTS

| | | | | |
|---|---|---|---|---|
| 2009/0248803 A1* | 10/2009 | Akaboshi | ............... | G06Q 10/06 |
| | | | | 709/204 |
| 2010/0138485 A1* | 6/2010 | Chow | ............... | G06F 17/30902 |
| | | | | 709/203 |
| 2011/0099621 A1 | 4/2011 | Lizarraga et al. | | |
| 2013/0204988 A1 | 8/2013 | Grewal et al. | | |
| 2013/0316675 A1* | 11/2013 | Luna | ....................... | H04W 4/26 |
| | | | | 455/408 |

OTHER PUBLICATIONS

Appendix P—List of IBM Patents or Patent Applications Treated as Related filed on Sep. 10, 2015, 2 pages.

U.S. Appl. No. 14/849,672, Entitled "Local Session Loopback Protocol", filed Sep. 10, 2015.

Beal, V. "What is Loopback Address? Webopedia". [online][retrieved on: Sep. 7, 2014] <http://www.webopedia.com/TERM/L/loopback_address.html>.

Hefeeda, M. et al. "Design and Evaluation of a Proxy Cache for Peer-to-Peer Traffic". IEEE Transactions on Computers, vol. 60. No. 7. Jul. 2011.

"How to install the Microsoft Loopback adapter in Windows XP". Article ID: 839013. [online] [retrieved on: Sep. 7, 2014] <http://support.microsoft.com/kb/839013/en-us>.

"Method for reduce the http traffic and improve the efficiency of web cache". An IP.com Prior Art Database Technical Disclosure. IP.com No. IPCOM000206907D. IP.com Electronic Publication: May 13, 2011.

\* cited by examiner

LOCAL SESSION LOOPBACK PROTOCOL

BACKGROUND

The present invention relates generally to the field of data caching systems, and more particularly to a local session loopback protocol. In data networking, network congestion occurs when a link or node is carrying so much data that its quality of service deteriorates. Typical effects include queuing delay, packet loss or the blocking of new connections. A consequence of these effects is an actual reduction in network throughput due to the heavy traffic loads on the network hardware. Network hardware devices may include gateways, routers, switches, bridges, hubs, and repeaters. A gateway is a device placed at a network node that interfaces with another network that uses different protocols. A switch is a device that connects devices together on a computer network by using a form of packet switching to forward data to the destination device. A bridge may be a hardware device or a software utility that connects two or more networks so that they can communicate. A hub is a device for connecting multiple devices together and making them act as a single network segment.

One method of reducing network congestion is to use data caching, i.e., storing data, so that future requests for that data can be served faster. Web browsers use web caches to store previous transmitted responses from web servers, such as web pages and images. Web caching reduces the amount of information that needs to be transmitted across the network, as long as the previously stored information in the cache can be re-used. This reduces bandwidth and processing requirements of the web server, and helps to improve responsiveness for users of the web. Search engines also use caching technology to make web pages they have indexed available from their cache, for example, providing a "cached" link next to each search result. This can prove useful when web pages from a web server are temporarily or permanently inaccessible.

SUMMARY

Embodiments in accordance with the present invention disclose a method, computer program product, and system for efficient utilization of available bandwidth over a data connection between a client computer and a server computer. In an embodiment, an echo component on both the sending and receiving side of the connection registers a set of connection parameters, and stores a copy of the last transmitted request or response of the client and server computer systems. Once an echo component detects a duplicate data request or response, it simulates and transmits the last stored response back to the client or server computer system and notifies the remote side echo component to send data when it is ready. When non-duplicate data is ready to be transmitted, the local side echo component disables the loopback protocol then notifies the remote side to do the same.

DETAILED DESCRIPTION

Embodiments of the present invention recognize that a loopback protocol can reduce network traffic by only transmitting data when the data is different from previously sent data. Normally repetitive requests issued during a network session contribute to useless network traffic and useless transmission processing. For example, if a user is viewing a web page and hits ENTER to refresh the data, all of the data are refreshed, with the whole page being sent back (unless compression and optimization are used). But if the page has not been changed by the application in the meantime, this processing is useless and results in unnecessary network use. Compression, or the transmission of the data (only data that has changed) can assist in reducing one or both of the above issues, but do not completely address them. Embodiments in accordance with the present invention contemplate reducing network bandwidth use by reducing useless traffic flowing over the network, without loss of information.

Figure 1:
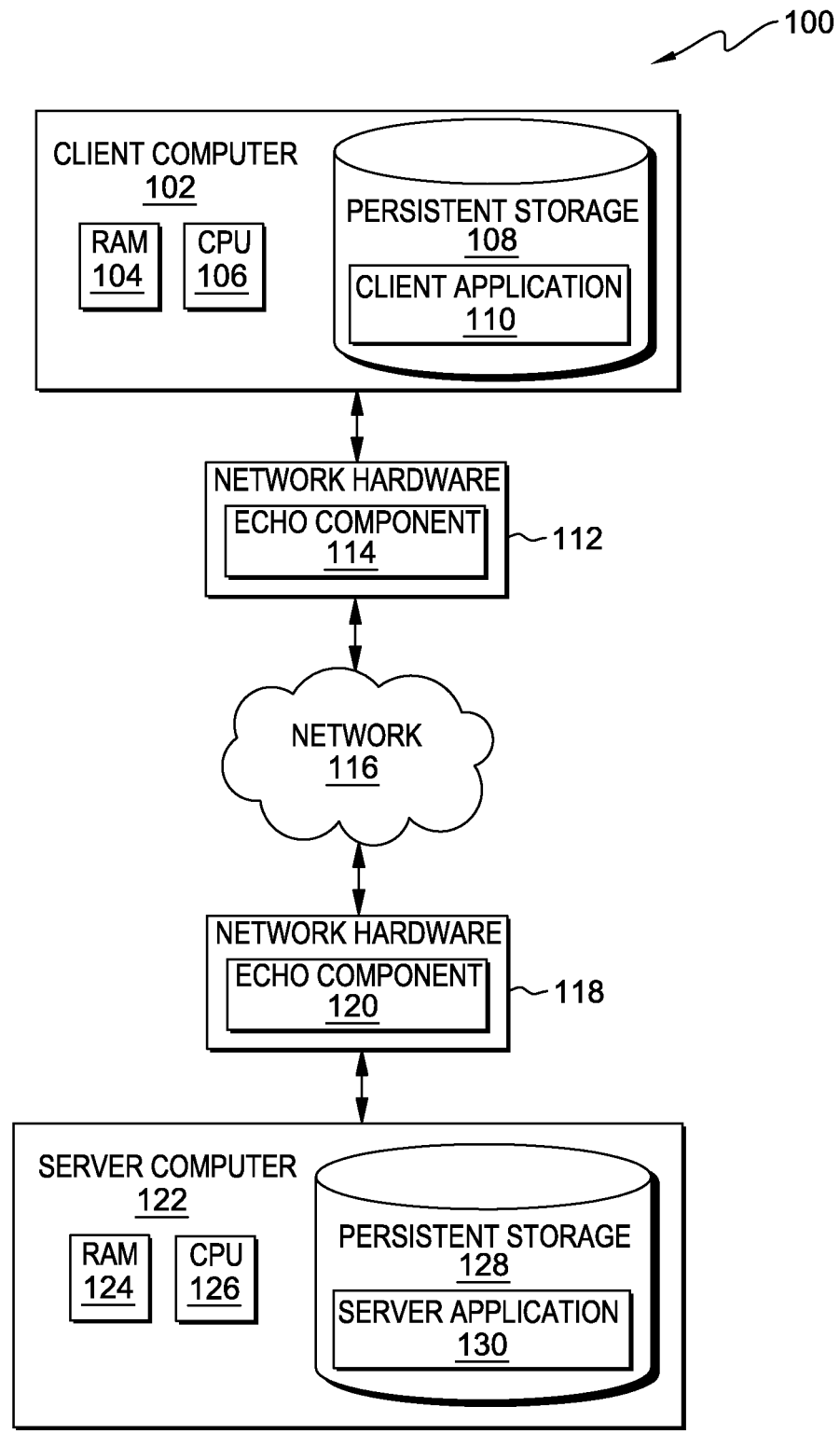
FIG. 1 is a functional block diagram illustrating a data processing environment, in an embodiment in accordance with the present invention.

Embodiments in accordance with the present invention will now be described in detail with reference to the figures. FIG. 1 is a functional block diagram illustrating a data processing environment, generally designated 100, in an embodiment in accordance with the present invention.

Data computing environment 100 includes client computer 102, network hardware 112 and 118, and server computer 122, all interconnected over network 116. Client computer 102 includes RAM 104, a central processing unit 106, and persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. Client application 110 is stored in persistent storage 108, which also includes operating system software as well as software that enables client computer 102 to communicate with network hardware 112 and 118, and server computer 122, over a data connection on network 116. Client application 110 is any computer application, such as a web browser, that can send and receive data over a network, e.g., network 116, or any other viable data network. There can be many more client and server computers in this environment than are depicted in FIG. 1.

Client computer 102 and server computer 122 may be a web server, or any other electronic device or computing system, capable of processing program instructions and receiving and sending data. In some embodiments, either or both client computer 102 and server computer 122 may be a laptop computer, a tablet computer, a netbook computer, a personal computer (PC), a desktop computer, a personal digital assistant (PDA), a smart phone, or any programmable electronic device capable of communicating over a data connection to network 116. In other embodiments, either or both client computer 102 and server computer 122 may represent server computing systems utilizing multiple computers as a server system, such as in a distributed computing environment. In general, client computer 102 and server computer 122 are representative of any electronic devices or combinations of electronic devices capable of executing machine-readable program instructions.

Network hardware 112 and 118 connect client computer 102 and server computer 122 to the interconnecting fabric of network 116 in data computing environment 100. Network hardware 112 and 118 may be a network router, network switch, laptop computer, tablet computer, netbook computer, personal computer (PC), a desktop computer, or any programmable electronic device capable of receiving and transmitting data between client computer 102 and server computer 122 via network 116, and with various components and devices within data computing environment 100. Network hardware 112 and 118 both include echo component 114 and 120 which register new data connections between client computer 102 and server computer 122, and prevent duplicate data from traversing network 116. In one embodiment, echo component 114 and 120 may be implemented in the software components of network hardware such as a router, switch, or gateway. In other embodiments, echo component 114 and 120 may be implemented as microcode in the firmware of a network adapter or network interface card of client computer 102 or server computer 122.

In FIG. 1, network 116 is shown as the interconnecting fabric between client computer 102, network hardware 112 and 118, and server computer 122. In practice, the connection may be any viable data transport network, such as, for example, a LAN or WAN. Network 116 can be, for example, a local area network (LAN), a wide area network (WAN) such as the Internet, or a combination of the two, and include wired, wireless, or fiber optic connections. In general, network 116 can be any combination of connections and protocols that will support communications between client computer 102, network hardware 112 and 118, and server computer 122 in various embodiments in accordance with the present invention.

Server computer 122 is also included in data computing environment 100. Server computer 122 includes RAM 124, a central processing unit 126, and persistent storage 128. Persistent storage 128 may, for example, be a hard disk drive. Alternatively, or in addition to a magnetic hard disk drive, persistent storage 128 can include a solid state hard drive, a semiconductor storage device, read-only memory (ROM), erasable programmable read-only memory (EPROM), flash memory, or any other computer-readable storage medium that is capable of storing program instructions or digital information. Server computer 122 may be a laptop computer, tablet computer, netbook computer, personal computer (PC), a desktop computer, a personal digital assistant (PDA), a smart phone, or any programmable electronic device capable of communicating with client computer 102, network hardware 112 and 118 via network 116 and with various components and devices within data computing environment 100. Persistent storage 128 includes server application 130. Server application 130 is any computer application, such as a web server, that can send and receive data over a network, e.g., network 116, or any other viable data network. There can be many more client and server computers in this environment than are depicted in FIG. 1.

Figure 2:
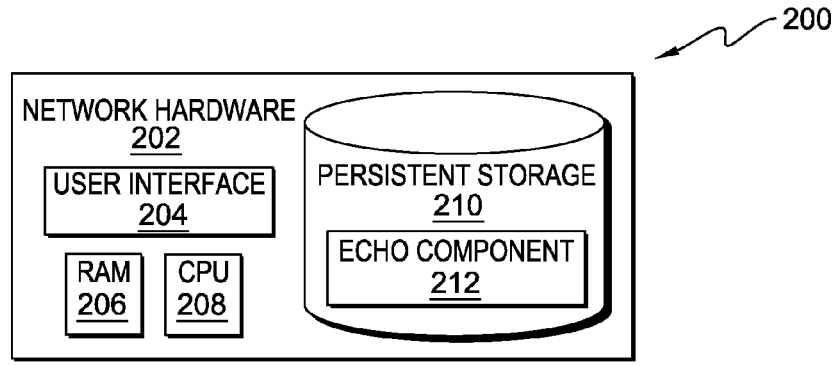
FIG. 2 is a functional block diagram illustrating the echo component in the network hardware within the data processing environment of FIG. 1, in an embodiment in accordance with the present invention.

FIG. 2 is a functional block diagram, generally designated 200, illustrating the echo component in the network hardware within the data processing environment of FIG. 1, in an embodiment in accordance with the present invention. Network hardware 202 is representative of network hardware 112 and 118. Network hardware 202 includes user interface 204, RAM 206, central processing unit (CPU) 208, and persistent storage 210.

User interface 204 provides an interface between a user of client computer 102 and server computer 122. User interface 204 may be a graphical user interface (GUI) or a web user interface (WUI) and can display text, documents, web browser windows, user options, application interfaces, and instructions for operation, and includes the information (such as graphics, text, and sound) that a program presents to a user, and the control sequences the user employs to control the program. User interface 204 may also be mobile application software that provides an interface between a user of network hardware 112 and 118. Mobile application software, or an "app", is a computer program designed to run on smartphones, tablet computers and other mobile devices. User interface 204 enables a user of network hardware 112 and 118 to configure and enable the loopback protocol, or any other networking software features on network hardware 112 and 118.

Persistent storage 210 includes echo component 212. Persistent storage 210 may, for example, be a hard disk drive. Alternatively, or in addition to a magnetic hard disk drive, persistent storage 210 may include a solid state hard drive, a semiconductor storage device, read-only memory (ROM), erasable programmable read-only memory (EPROM), flash memory, or any other computer-readable storage medium that is capable of storing program instructions or digital information. Echo component 212 is stored in persistent storage 210, which also includes operating system software as well as software that enables network hardware 202 to communicate with client computer 102 and server computer 122 over a data connection on network 116. Echo component 212 is responsible for registering the sending and receiving data requests to activate the loopback protocol, simulating data when duplicate data requests are received, requesting and informing the opposite side network hardware of data, and disabling the loopback protocol once new data is ready to send.

In one embodiment, echo component 212 may be implemented in network hardware such as routers, switches, and gateways. In other embodiments, echo component 212 may be implemented in the network adaptors of the devices connected to network 116 in data computing environment 100. In general, this solution may be implemented in any product that uses a web user interface.

Figure 3:
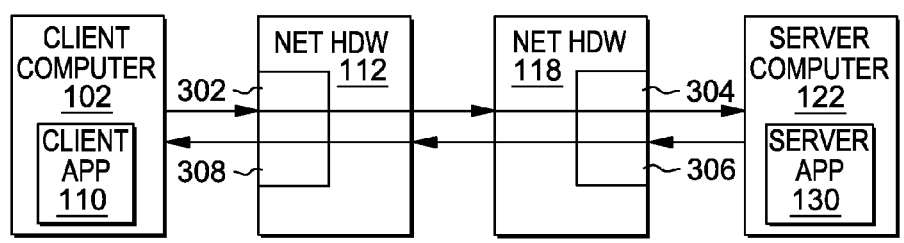
FIG. 3 is a functional block diagram illustrating the loopback protocol connection establishment between a client and server computer within the data processing environment of FIG. 1, in an embodiment in accordance with the present invention.

FIG. 3 is a functional block diagram illustrating the loopback protocol connection established between a client and server computer within the data processing environment of FIG. 1, in an embodiment in accordance with the present invention. Client application 110 on client computer 102 issues a request to server application 130 on server computer 122. In one embodiment, client application 110 may be a web browser displaying hypertext markup language (HTML) web pages. In other embodiments, client application may be any application that can cache data. The request is transmitted to network hardware 112 and is registered into a sender request source table on echo component 114 as indicated by connection request indicator 302.

The request is then transmitted to network hardware 118 and is registered into a receiver request destination table on echo component 120 as indicated by connection request indicator 304. Server application 130 on server computer 122 processes the request and transmits a response to client application 110 on client computer 102. The response is received at network hardware 118 and is registered into a sender response source table on echo component 120 as indicated by connection response indicator 306. The request is then transmitted to network hardware 112 and is registered into a receiver response destination table on echo component 114 as indicated by connection response indicator 308. Client application 110 on client computer 102 then processes the response. Details of the connection establishment are described in greater detail with regard to FIG. 6.

Figure 4:
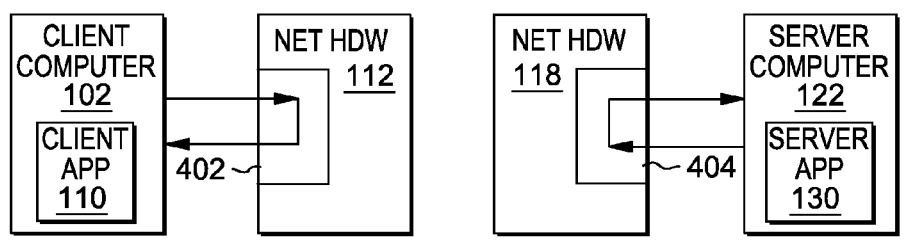
FIG. 4 is a functional block diagram illustrating the echo component loopback mechanism simulating data when a client or server computer transmits duplicate data within the data processing environment of FIG. 1, in an embodiment in accordance with the present invention.

FIG. 4 is a functional block diagram illustrating the echo component loopback mechanism simulating data when a client or server computer transmits duplicate data within the data processing environment of FIG. 1, in an embodiment in accordance with the present invention. Client application 110 on client computer 102 establishes a connection to server application 130 on server computer 122 as described in FIG. 3. In an example embodiment, a web browser on client computer 102 displays an HTML web page stored on persistent storage 128 on server computer 122, accessible by server application 130. A user of client application 110 on client computer 102 repeatedly refreshes the web page. Echo component 114 detects the duplicate data requests and simulates server computer 122 data response as indicated by loopback indicator 402, and simulates the server computer 122 response, e.g., the last received server-side response. Echo component 120 on network hardware 118 performs the same loopback operation during this time.

One benefit of using this loopback protocol is avoiding transmission of large amounts of unnecessary data. Data transmissions occur only when needed. This protocol can be used even when data is transmitted periodically with a low frequency, such as a signal to test network availability sent by both the client and server application sides. The same mechanism can also be applied to keep-alive signals which are exchanged between two session partners. As shown in FIG. 4, the keep-alive will be locally generated and simulated, and will not flow over the network. Details of echo components 114 and 120 loopback mechanism are described in greater detail with regard to FIG. 7.

Figure 5:
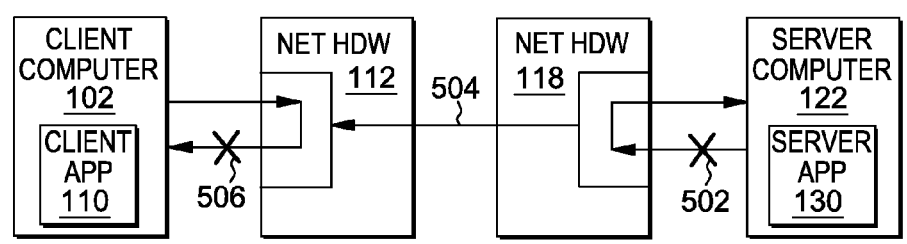
FIG. 5 is a functional block diagram illustrating the server side echo component detecting a problem, disabling the local loopback protocol, then notifying the remote side, in an embodiment in accordance with the present invention.

FIG. 5 is a functional block diagram illustrating the server side echo component detecting a problem, disabling the local loopback protocol, then notifying the remote side, in an embodiment in accordance with the present invention. Client application 110 on client computer 102 establishes a connection to server application 130 on server computer 122 as described in the FIG. 3 discussion, and is actively sending and receiving data from server application 130 on client computer 122, or any other computers in data computing environment 100. In this example, echo component 114 and 120 are simulating the last received responses from the associated sending and receiving sides, in addition to the keep-alive signals transmitted by client application 110 and server application 130.

Server application 130 terminates unexpectedly on server computer 122 by an application software crash, or system crash, by server computer 122, as indicated by lost connection indicator 502. Echo component 120 on network hardware 118 detects the problem, turns off the loopback protocol for the failed connection, and notifies echo component 114 on network hardware 112 of the connection failure, as indicated by lost connection indicator 504. Echo component 114 on network hardware 112 receives the notification, turns off the loopback protocol for the failed connection, then notifies client application 110 of the connection termination as indicated by lost connection indicator 506.

Figure 6:
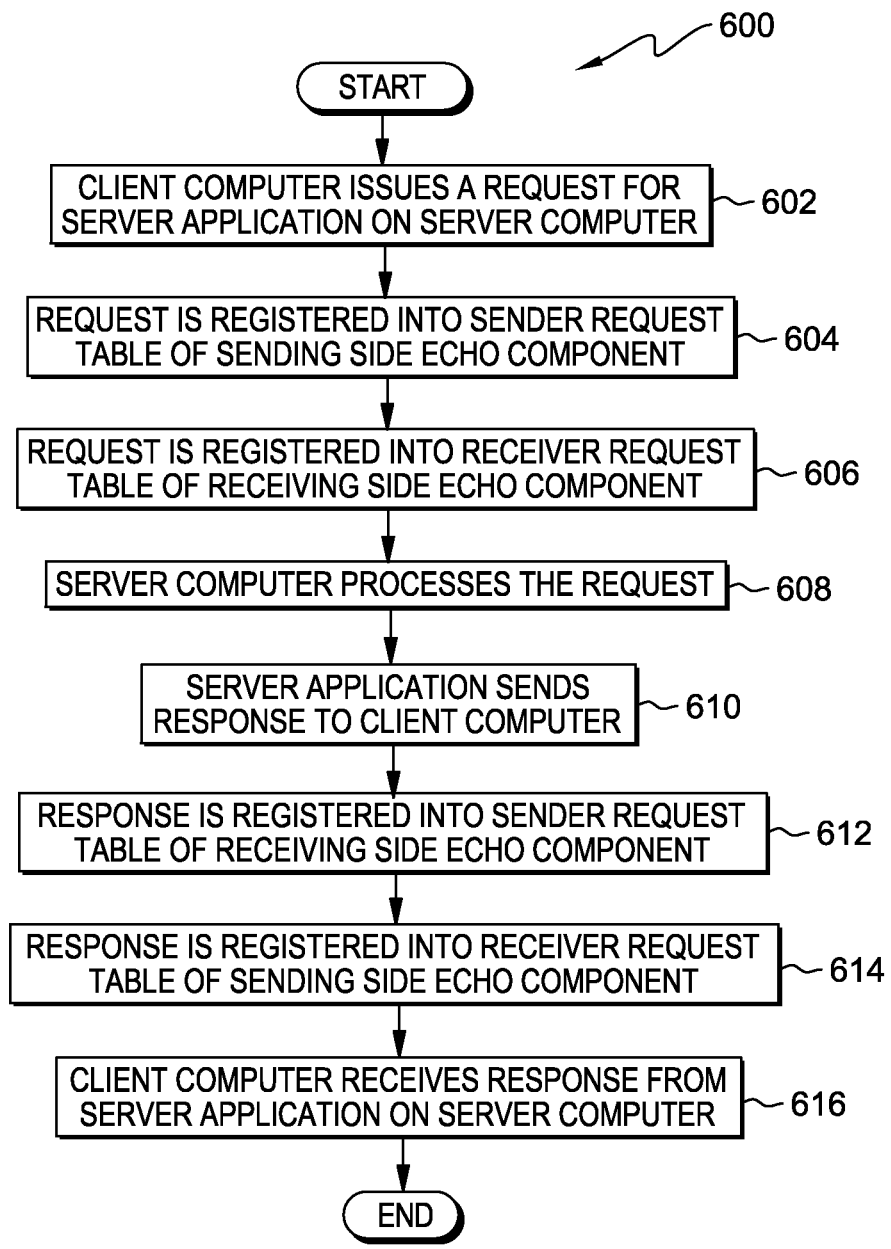
FIG. 6 is a flowchart depicting operational steps for the loopback protocol connection establishment between a client and server computer, in an embodiment in accordance with the present invention.

FIG. 6 is a flowchart, generally designated 600, depicting operational steps for the loopback protocol connection established between a client and server computer, in an embodiment in accordance with the present invention. Client application 110 on client computer 102 transmits a request for data, (e.g., a web page to be displayed on client computer 102), to server application 130 on server computer 122 as depicted in step 602. In other embodiments, client application may be any application incorporating a caching system, such as browser caches, local proxies, memcaches and heartbeat or keep-alive systems. A browser cache is a mechanism used for the temporary storage, i.e., caching, of web documents, such as HTML web pages and digital images, to reduce bandwidth usage, server load, and perceived lag in response times. A web cache stores copies of documents passing through it. A local proxy is a computer system or an application that acts as an intermediary for requests from clients seeking resources from other servers. A client connects to the proxy server, requesting some service, such as a file, connection, web page, or other resource available from a different server, and the proxy server evaluates the request as a way to simplify and control its complexity. A memcache is a memory caching system that is often used to speed up dynamic database-driven websites, by caching data and objects in RAM, to reduce the number of times an external data source, e.g., a database or application program interface (API), must be read. A heartbeat or keep-alive is a message sent by one device to another to check that the link or connection between the two is operating, or to prevent this link from being broken.

The request is received by network hardware 112 and is registered into a sender request source table on echo component 114 as depicted by step 604. Echo component 114 stores the request using the source request address, target request address, and request content. The source and target request addresses are the source and destination internet protocol (IP) addresses. Internet Protocol (IP) is the communications protocol that provides an identification and location system for computers on networks, and routes traffic across the internet. In one embodiment, echo component 114 may store the source and target addresses using internet protocol version 4 (IPv4). In another embodiment, echo component 114 may store the source and target addresses using internet protocol version 6 (IPv6). In other embodiments in accordance with the present invention, other suitable communications protocols may be used.

The request is then transmitted to network hardware 118 and is registered into a receiver request destination table on echo component 120, as depicted by step 606. Echo component 120 stores the request in much the same fashion as echo component 114, using the source request address, target request address, and request content. The request is then processed by server application 130 on server computer 122, which transmits a response to client application 110 on client computer 102, as depicted in steps 608 and 610. Network hardware 118 receives the response and registers it into a sender response source table on echo component 120, using the source response address, target response address, and request content as depicted in step 612. The request is then transmitted to network hardware 112 and is registered into a receiver response destination table on echo component 114, using the source response address, target response address, and request content as depicted in step 614. Client application 110 on client computer 102 then receives and processes the response as depicted in step 616.

Figure 7:
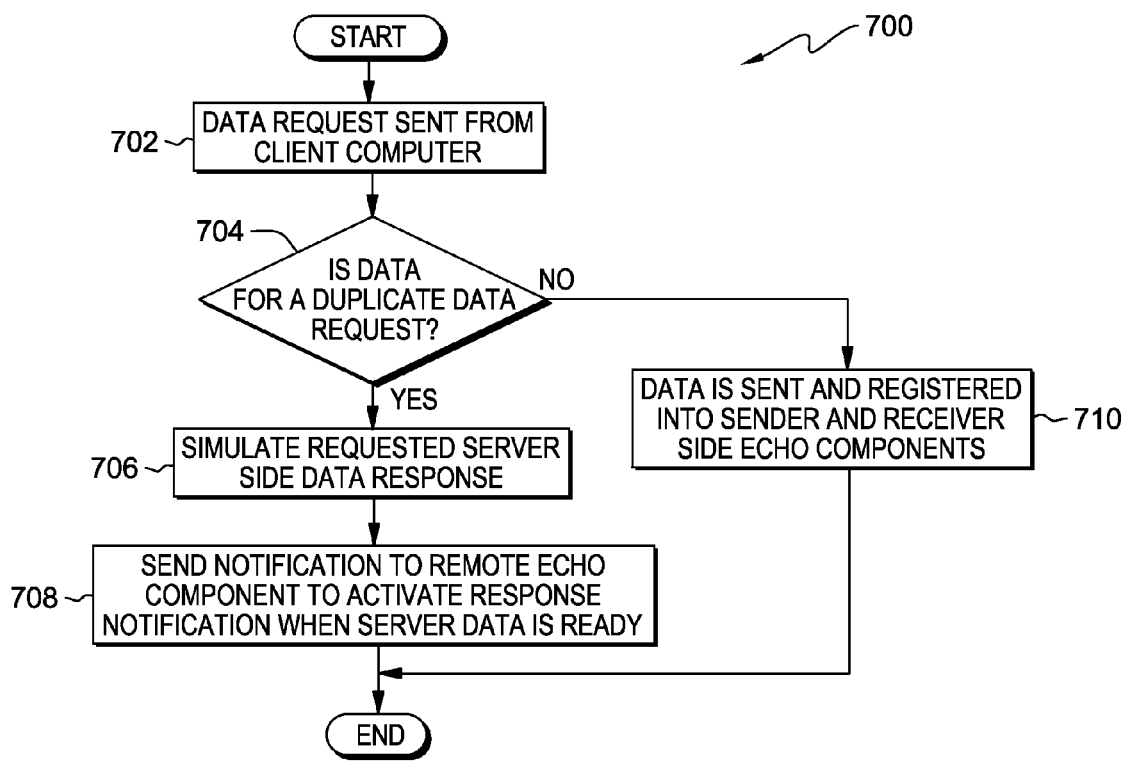
FIG. 7 is a flowchart depicting operational steps of the loopback protocol data handling from a client side computer after the connection is established, in an embodiment in accordance with the present invention.

FIG. 7 is a flowchart, generally designated 700, depicting operational steps of the loopback protocol data handling, from a client side computer, after the connection is established, in an embodiment in accordance with the present invention. Client application 110 on client computer 102 transmits a data request to server application 130 on server computer 122 as depicted in step 702. In one embodiment, the data request may be for a new request sent by a user of client computer 102. In another embodiment, the data request may be a duplicate or repeat of the last transmitted data request. Echo component 114 determines if the data is a duplicate request as depicted in decision 704. If the data request is not a duplicate request, ("no" branch, decision 704) echo component 114 registers the data into the sender request source table using the source request address, target request address, and request content, and the process of FIG. 6 is followed as depicted by step 710. In one embodiment, echo component 114 and echo component 120 may be used to detect and deter denial of service attacks. In other embodiments, echo component 114 and echo component 120 may also be used to prevent computer systems infected with malware or viruses from sending out repeated data requests.

If the data request is a duplicate request, ("yes" branch, decision 704) echo component 114 then simulates the last stored requested response from server application 130 and transmits it back to client application 110 as depicted in step 706. In one embodiment, echo component 114 may simulate and transmit the simulated response back to client application 110. In another embodiment, another software component of network hardware 112 may be responsible for simulating and transmitting the required response to client application 110. Echo component 114 then sends a notification to echo component 120 instructing it to activate a response notification once data from server application 130 is ready. In one embodiment, this response notification may be used to keep statistics on both echo components to indicate how many duplicate data requests have been received for a particular connection.

Figure 8:
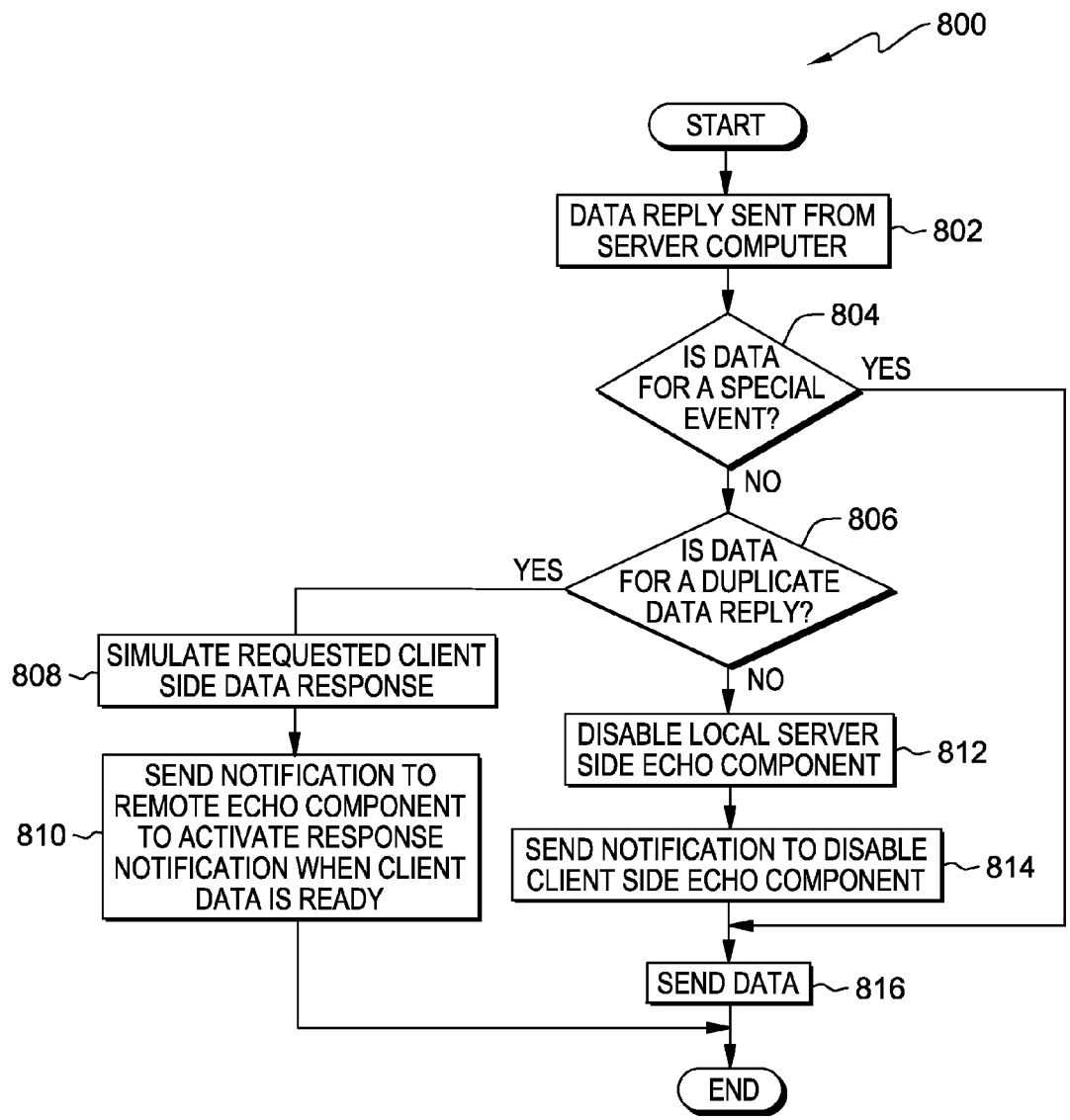
FIG. 8 is a flowchart depicting the operational steps of the loopback protocol data handling from a server side computer after the connection is established, in an embodiment in accordance with the present invention.

FIG. 8 is a flowchart, generally designated 800, depicting the operational steps of the loopback protocol data handling from a server side computer after the connection is established, in an embodiment in accordance with the present invention. Server application 130 on server computer 122 transmits a data reply to client application 110 on client computer 102 as depicted in step 802. The data is received at network hardware 118 and echo component 120. Echo component 120 checks to see if the data is for special event data as depicted in decision 804. In one embodiment, special event data may be a signal such as a transmission control protocol (TCP) reset for a connection that unexpectedly ends.

If the data is for a special event data, ("yes" branch, decision 804), network hardware 118 bypasses echo component 120 and transmits the data to the remote side as depicted in step 816. If the data is not for a special event data, ("no" branch, decision 804), echo component 120 checks to see if the data is a duplicate of the last received reply as depicted in decision 806. If the data is a duplicate, ("yes" branch, decision 806), echo component 120 simulates the client side data response as depicted in step 808. Echo component 120 then sends a notification to echo component 114 instructing it to activate a response notification once data from client application 110 is ready as depicted in step 810. An example of this would be where server computer 122 transmits data to client computer 102, but client computer 102 does not respond, causing a duplicate data request to be sent.

If the data is not duplicate data, ("no" branch, decision 806), echo component 120 disables the echo component for the connection as depicted in step 812. Echo component 120 then sends a notification to echo component 114 to disable the client side echo component for the connection as shown in step 814, and transmits the data as depicted in step 816. In another embodiment, the notification to disable the loopback protocol is sent with the data by echo component 120.

Figure 9:
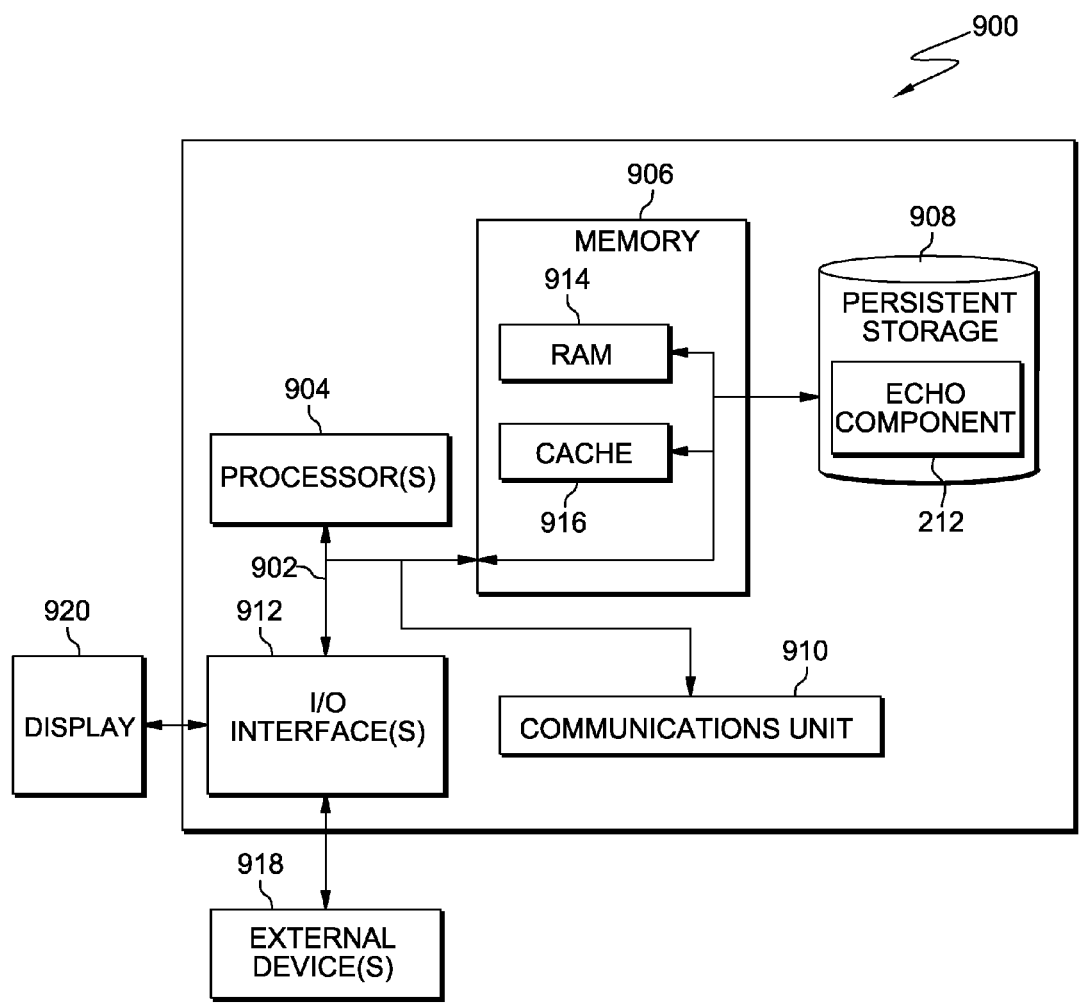
FIG. 9 depicts a block diagram of components of the network hardware containing the echo component, in an embodiment in accordance with the present invention.

FIG. 9 depicts a block diagram, generally depicted by the numeral 900, of components of network hardware 202 containing echo component 212, in an embodiment in accordance with the present invention. It should be appreciated that FIG. 9 provides only an illustration of one implementation and does not imply any limitations with regard to the environments in which different embodiments may be implemented. Many modifications to the depicted environment may be made.

Network hardware 202 includes communications fabric 902, which provides communications between computer processor(s) 904, memory 906, persistent storage 908, communications unit 910, and input/output (I/O) interface(s) 912. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer readable storage media. In this embodiment, memory 906 includes random access memory (RAM) 914 and cache memory 916. In general, memory 906 can include any suitable volatile or non-volatile computer readable storage media.

Echo component 212 is stored in persistent storage 908 for execution and/or access by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of persistent storage 908.

Communications unit 910, in these examples, provides for communications with other data processing systems or devices, including resources of network 116, client computer 102, network hardware 112, network hardware 118, and server computer 122. In these examples, communications unit 910 includes one or more network interface cards. Communications unit 910 may provide communications through the use of either or both physical and wireless communications links. Echo component 212 may be downloaded to persistent storage 908 through communications unit 910.

I/O interface(s) 912 allows for input and output of data with other devices that may be connected to network hardware 202. For example, I/O interface 912 may provide a connection to external devices 918 such as a keyboard, keypad, a touch screen, and/or some other suitable input device. External devices 918 can also include portable computer readable storage media such as, for example, thumb drives, portable optical or magnetic disks, and memory cards. Software and data used to practice embodiments of the present invention, e.g., echo component 212, can be stored on such portable computer readable storage media and can be loaded onto persistent storage 908 via I/O interface(s) 912. I/O interface(s) 912 also connect to a display 920.

Display 920 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for transmitting data, the computer program product comprising:
   one or more computer readable storage media and program instructions stored on the one or more computer readable storage media, wherein the one or more computer readable storage medium are not transitory signals per se, the program instructions comprising:
   program instructions to register, by a first network device, a set of connection parameters and content to enable a loopback protocol on the first network device for a data connection between a client computer and a server computer, wherein the first network device is a programmable electronic device capable of receiving and transmitting data between the client computer and the server computer, wherein the first network device is directly connected to the client computer, wherein the first network device is connected to a second network device via a network, wherein the second network device is directly connected to the server computer, and wherein the registered content includes a first data request transmitted by the client computer and a first data response to the first data request, transmitted by the server computer;
   program instructions to detect, by the first network device, a duplicate data request for the data connection between the client computer and the server computer, wherein the client computer is the sender of the duplicate data request and the server computer is the intended receiver of the duplicate data request, and wherein the duplicate data request is a duplicate of the first data request transmitted by the client computer;
   program instructions to simulate, by the first network device, a response to the duplicate data request, based on the loopback protocol on the first network device being enabled, wherein simulating the response includes responding to the duplicate data request with a stored copy of the first data response transmitted by the server computer, without obtaining a new response to the duplicate data request from the server computer;
   program instructions to, upon simulating the response, transmit, by the first network device, a notification to the second network device;
   program instructions to, upon receiving a second data request from the client computer, wherein the second data request is different from the previously registered first data request, register, by the first network device, the second data request, and transmit, by the first network device, the second data request to the second network device; and
   program instructions to, upon receiving a notification from the second network device indicating a detection of a failed connection of an application on the server computer, disable, by the first network device, the loopback protocol on the first network device, and notify, by the first network device, the client computer of the failed connection.

2. The computer program product of claim 1, wherein program instructions to register, by a first network device, a set of connection parameters and content to enable a loopback protocol on the first network device for a data connection between a client computer and a server computer further comprise:
   program instructions to store a plurality of source and destination addresses, wherein the source and destination addresses are that of the client computer and the server computer.

3. The computer program product of claim 1, wherein program instructions to detect, by the first network device, a duplicate data request for the data connection between the client computer and the server computer further comprise:
   program instructions to compare, by the first network device, a transmitted data request with a stored copy of the first data request to determine that the transmitted data request is a duplicate data request.

4. The computer program product of claim 1, wherein program instructions to simulate, by the first network device, a response to the duplicate data request, based on the loopback protocol on the first network device being enabled, further comprise:
   program instructions to transmit, by the first network device, the stored copy of the first data response transmitted by the server computer, to the client computer.

5. The computer program product of claim 1, wherein the first network device is one of the following:
   a gateway;
   a router;
   a switch;
   a bridge;
   a hub; and
   a repeater.

6. A computer system for transmitting data, the computer system comprising:
   one or more computer processors;
   one or more computer readable storage media;
   program instructions stored on the computer readable storage media for execution by at least one of the one or more processors, the program instructions comprising:
   program instructions to register, by a first network device, a set of connection parameters and content to enable a loopback protocol on the first network device for a data connection between a client computer and a server computer, wherein the first network device is a programmable electronic device capable of receiving and transmitting data between the client computer and the server computer, wherein the first network device is directly connected to the client computer, wherein the first network device is connected to a second network device via a network, wherein the second network device is directly connected to the server computer, and wherein the registered content includes a first data request transmitted by the client computer and a first data response to the first data request, transmitted by the server computer;

program instructions to detect, by the first network device, a duplicate data request for the data connection between the client computer and the server computer, wherein the client computer is the sender of the duplicate data request and the server computer is the intended receiver of the duplicate data request, and wherein the duplicate data request is a duplicate of the first data request transmitted by the client computer;

program instructions to simulate, by the first network device, a response to the duplicate data request, based on the loopback protocol on the first network device being enabled, wherein simulating the response includes responding to the duplicate data request with a stored copy of the first data response transmitted by the server computer, without obtaining a new response to the duplicate data request from the server computer;

program instructions to, upon simulating the response, transmit, by the first network device, a notification to the second network device;

program instructions to, upon receiving a second data request from the client computer, wherein the second data request is different from the previously registered first data request, register, by the first network device, the second data request, and transmit, by the first network device, the second data request to the second network device; and program instructions to, upon receiving a notification from the second network device indicating a detection of a failed connection of an application on the server computer, disable, by the first network device, the loopback protocol on the first network device, and notify, by the first network device, the client computer of the failed connection.

7. The computer system of claim 6, wherein program instructions to register, by a first network device, a set of connection parameters and content to enable a loopback protocol on the first network device for a data connection between a client computer and a server computer further comprise:

program instructions to store a plurality of source and destination addresses, wherein the source and destination addresses are that of the client computer and the server computer.

8. The computer system of claim 6, wherein program instructions to detect, by the first network device, a duplicate data request for the data connection between the client computer and the server computer further comprise:

program instructions to compare, by the first network device, a transmitted data request with a stored copy of the first data request to determine that the transmitted data request is a duplicate data request.

9. The computer system of claim 6, wherein program instructions to simulate, by the first network device, a response to the duplicate data request, based on the loopback protocol on the first network device being enabled, further comprise:

program instructions to transmit, by the first network device, the stored copy of the first data response transmitted by the server computer, to the client computer.

10. The computer system of claim 6, wherein the first network device is one of the following:

a gateway;
a router;
a switch;
a bridge;
a hub; and
a repeater.

\* \* \* \* \*